(12) United States Patent
Brugman

(10) Patent No.: US 12,486,237 B2
(45) Date of Patent: Dec. 2, 2025

(54) POLYMORPHIC FORM OF (-)-CIBENZOLINE SUCCINATE

(71) Applicant: CELLTRION INC., Incheon (KR)

(72) Inventor: Sander Brugman, Amsterdam (NL)

(73) Assignee: CELLTRION INC., Incheon (KR)

( * ) Notice: Subject to any disclaimer, the term of this patent is extended or adjusted under 35 U.S.C. 154(b) by 665 days.

(21) Appl. No.: 17/798,406

(22) PCT Filed: Mar. 26, 2021

(86) PCT No.: PCT/KR2021/003747
§ 371 (c)(1),
(2) Date: Aug. 9, 2022

(87) PCT Pub. No.: WO2021/194291
PCT Pub. Date: Sep. 30, 2021

(65) Prior Publication Data
US 2023/0088511 A1    Mar. 23, 2023

(30) Foreign Application Priority Data
Mar. 27, 2020   (KR) .................. 10-2020-0037527

(51) Int. Cl.
C07D 233/10   (2006.01)
(52) U.S. Cl.
CPC ........ *C07D 233/10* (2013.01); *C07B 2200/13* (2013.01)
(58) Field of Classification Search
CPC .................................................. C07D 233/10
See application file for complete search history.

(56) References Cited

U.S. PATENT DOCUMENTS

2018/0050991 A1   2/2018   Lin et al.

FOREIGN PATENT DOCUMENTS

| CN | 102617383 | 8/2012 |
|---|---|---|
| IN | 201841036791 | 9/2019 |
| JP | 2010-132561 | 6/2010 |
| WO | PCT/KR2021/003747 | 7/2021 |

OTHER PUBLICATIONS

Haruno et al., "Antiarrhythmic Effects of Optical Isomers of Cibenzoline on Canine Ventricular Arrhythmias", Journal of Cardiovascular Pharmacology 16(3), 1990, United States, pp. 376-382.
Kotake et al., "Heart Failure Elevates Serum Levels of Cibenzoline in Arrhythmic Patients", Circulation Journal vol. 70, May 2006, Japan, pp. 588-592.

(Continued)

*Primary Examiner* — Paul V Ward
(74) *Attorney, Agent, or Firm* — Wells St. John P.S.

(57) ABSTRACT

The present invention relates to a crystalline form of (−)-cibenzoline succinate. The present invention also provides a process for preparing (−)-cibenzoline succinate and crystalline form thereof. The crystalline form of (−)-cibenzoline succinate according to the present invention has low hygroscopicity, and excellent stability under accelerated conditions and long-term storage conditions, and may be stably maintained without a change in content thereof for a long period of time.

14 Claims, 5 Drawing Sheets

(56) References Cited

OTHER PUBLICATIONS

Koyata et al., "Convenient Preparation of Optically Active Cibenzoline and Analogues from 3,3-diaryl-2-propen-1-ols", Tetrahedron: Asymmetry, vol. 20, No. 17, 2009, United Kingdom, pp. 2065-2071.
Miura et al., "Syntheses of (R)-(+)-cibenzoline and Analogues via Catalytic Enantioselective Cyclopropanation using (S)-phenylalanine-derived Disulfonamide", Tetrahedron: Asymmetry, vol. 17, No. 22, 2006, United Kingdom, pp. 3067-3069.
Van den Brand et al., "Haemodynamic Effects of Intravenous Cibenzoline in Patients with Coronary Heart Disease", European Journal of Clinical Pharmacology vol. 26, Germany, 1984, pp. 297-302.

POLYMORPHIC FORM OF (−)-CIBENZOLINE SUCCINATE

RELATED PATENT DATA

This application is a 35 U.S.C. § 371 of and claims priority to PCT International Application No. PCT/KR2021/003747, filed 26 Mar. 2021, which claims priority to KR Application No. 10-2020-0037527, filed 27 Mar. 2020, each of which is incorporated herein by reference.

TECHNICAL FIELD

The present invention relates to a polymorphic form of (−)-cibenzoline succinate.

Moreover, the present invention provides a process for preparing a polymorphic form of (−)-cibenzoline succinate.

BACKGROUND ART

Cibenzoline succinate (racemic) is chemically known as (±)-2-(2,2-diphenylcyclophenyl)-2-imidazoline succinate having a structure represented by Formula (II). It was developed and marketed as Cipralan® by Bristol-Myers Squibb (BMS) and Exacor® by Laboratory XO in France. Cibenzoline succinate (racemic) is an antiarrhythmic drug marketed under the trade names Cipralan and Exacor. Racemic cibenzoline succinate was approved in France on Oct. 21, 1983 for treating patients with arrhythmic heart disease. Cibenzoline is effective in treating arrhythmic heart disease (Eur J Clin Pharmacol. 1984; 26(3):297-302) and heart failure (Circ J. 2006 May; 70(5):588-92).

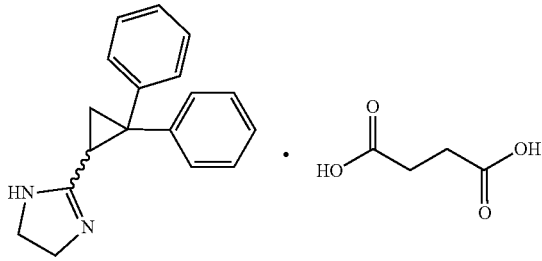

Formula (II)

Studies on only polymorphic forms of cibenzoline succinate (racemic) have been conducted (Japanese Patent Application Publication No. JP2010132561).

The use of enantiomerically pure drugs can lead to simpler and more selective pharmacologic profiles, improved therapeutic indices, simpler pharmacokinetics due to different rates of metabolism of the different enantiomers, and decreased drug interactions, and drug companies are increasingly using chiral switching as a marketing strategy. In addition, due to different pharmacological activity, enantiomers of chiral drugs can differ in toxicity from racemic drugs.

It is known that compounds having polymorphic forms exhibit different physical properties for each crystalline form. In particular, in pharmaceuticals, there are differences in solubility, dissolution rate, stability, absorption, etc. between crystalline forms. Even when the same compound is used, differences in the formulation process, storage stability, bioavailability, and rate or intensity of drug action may occur due to different crystalline forms of the same compound.

Thus, in order to ensure constant bioavailability when a compound having a polymorphic form is used as a pharmaceutical drug, it is necessary to stably provide a uniform crystalline form of the compound. Accordingly, the present inventors have developed a novel and stable crystalline form by studying polymorphic forms of (−)-cibenzoline and a salt thereof.

DISCLOSURE

Technical Problem

The present invention provides a crystalline form of (−)-cibenzoline succinate, which has any one selected from the group consisting of the following X-ray powder diffraction patterns (XRPDs):

i) a crystalline form having an X-ray powder diffraction spectrum comprising diffraction peaks at 9.7°, 14.9°, 21.5°, 23.4° and 24.1° (2θ±0.2°) (hereinafter referred to as "crystalline form 1");

ii) a crystalline form having an X-ray powder diffraction spectrum comprising diffraction peaks at 20.6°, 21.1°, 22.9°, 25.2° and 37.4° (2θ±0.2°) (hereinafter referred to as "crystalline form 2"); and iii) a crystalline form having an X-ray powder diffraction spectrum comprising diffraction peaks at 13.0°, 14.8°, 23.3°, 25.5° and 26.1° (2θ±0.2°) (hereinafter referred to as "crystalline form 3").

The present invention provides a crystalline form of (−)-cibenzoline succinate, which is a triclinic crystal system and has a space group of P1.

The present invention provides a process for preparing crystalline form 3 of (−)-cibenzoline succinate comprising steps of:

a) dissolving (−)-cibenzoline succinate represented by Formula (IA) in a polar solvent; and b) precipitating crystalline form 3 of (−)-cibenzoline succinate by adding a hydrocarbon solvent having 6 or more carbon atoms to the solution of step a):

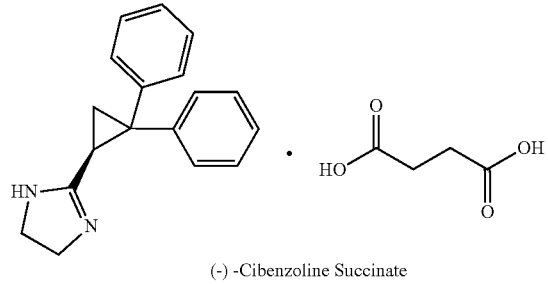

Formula (IA)

(−)-Cibenzoline Succinate

The present invention provides a pharmaceutical composition containing a crystalline form of (−)-cibenzoline succinate and a pharmaceutically acceptable carrier, diluent or excipient.

Technical Solution

A first embodiment of the present invention provides a crystalline form of (−)-cibenzoline succinate, which has any one selected from the group consisting of the following X-ray powder diffraction patterns (XRPDs):

i) a crystalline form having an X-ray powder diffraction spectrum comprising diffraction peaks at 9.7°, 14.9°, 21.5°, 23.4° and 24.1° (2θ±0.2°) (hereinafter referred to as "crystalline form 1");

ii) a crystalline form having an X-ray powder diffraction spectrum comprising diffraction peaks at 20.6°, 21.1°, 22.9°, 25.2° and 37.4° (2θ±0.2°) (hereinafter referred to as "crystalline form 2"); and iii) a crystalline form having an X-ray powder diffraction spectrum comprising diffraction peaks at 13.0°, 14.8°, 23.3°, 25.5° and 26.1° (2θ±0.2°) (hereinafter referred to as "crystalline form 3").

According to one embodiment of the present invention, the crystalline form of (−)-cibenzoline succinate may be anhydrous and may have an XRPD pattern comprising diffraction peaks at 13.0°, 14.8°, 23.3°, 25.5° and 26.1° (2θ±0.2°).

According to one embodiment of the present invention, the crystalline form of (−)-cibenzoline succinate may be anhydrous and may have an XRPD pattern further comprising at least one diffraction peak selected from the group consisting of diffraction peaks at 9.7°, 12.8°, 14.6°, 16.1°, 16.3°, 17.5°, 19.4°, 22.4°, 22.7°, 23.5° and 25.4° (2θ±0.2°).

According to one embodiment of the present invention, the crystalline form of (−)-cibenzoline succinate may be anhydrous and may have a differential scanning calorimetry (DSC) endothermic peak at a temperature of 190 to 193° C. at a temperature rise rate of 10° C./min.

According to one embodiment of the present invention, in the crystalline form of (−)-cibenzoline succinate, 50% of the particles [$D_{50}$] may have a particle size of 10 μm to 50 μm.

According to an embodiment of the present invention, the crystalline form of (−)-cibenzoline succinate may be characterized by having the following dynamic vapor sorption (DVS) pattern:
  i) showing a water absorption rate of 0.3% in a sorption cycle;
  ii) showing a water absorption rate of 0.2% at 80% relative humidity; and
  iii) completely releasing 0.3% absorbed water in a desorption cycle.

A second embodiment of the present invention provides a crystalline form of (−)-cibenzoline succinate, which is a triclinic crystal system and has a space group of P1.

According to one embodiment of the present invention, the crystalline form of (−)-cibenzoline succinate may be a triclinic crystal system and may have the following lattice constant parameters:
  a=7.87(6)Å
  b=8.00(9)Å
  c=9.36(12)Å
  α=96.71 (5)°
  β=95.47(7)°
  γ=118.51(6)°
  V=507.06(10)Å³
  Z=1(1)

A third embodiment of the present invention provides a process for preparing crystalline form 3 of (−)-cibenzoline succinate comprising steps of:
  a) dissolving (−)-cibenzoline succinate represented by Formula (IA) in a polar solvent; and
  b) precipitating crystalline form 3 of cibenzoline succinate by adding a hydrocarbon solvent having 6 or more carbon atoms to the solution of step a):

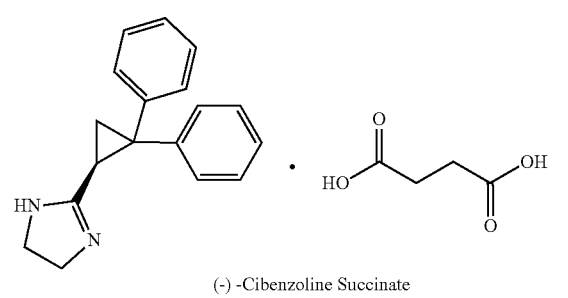

Formula (IA)

(−)-Cibenzoline Succinate

According to one embodiment of the present invention, the polar solvent in step a) may be water, an alcohol-based solvent, an aldehyde-based solvent, an ester-based solvent, an amide-based solvent, or a mixture thereof.

According to one embodiment of the present invention, the alcohol-based solvent may be methanol, ethanol, linear or branched propanol, linear or branched butanol, linear or branched pentanol, or a mixture thereof.

According to one embodiment of the present invention, the hydrocarbon solvent having 6 or more carbon atoms may be cyclohexane, cycloheptane, n-hexane, n-heptane, or a mixture thereof.

A fourth embodiment of the present invention provides a pharmaceutical composition containing an effective amount of a crystalline form of (−)-cibenzoline succinate.

According to one embodiment of the present invention, the composition may be in the form of a capsule or tablet for oral administration.

Preparation of (−)-Cibenzoline Succinate (−)-Cibenzoline succinate, which is an enantiomerically pure isomer represented by Formula (IA) according to the present invention, may be prepared through the following process comprising the following steps:

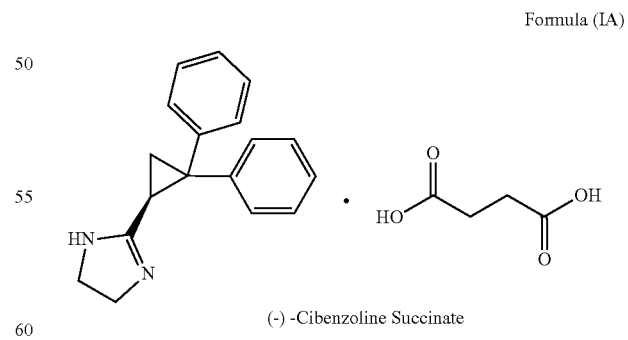

Formula (IA)

(−)-Cibenzoline Succinate a) preparing a racemic cibenzoline free base represented by Formula (III) by reacting racemic cibenzoline succinate represented by Formula (II) with a base;

Formula (II)

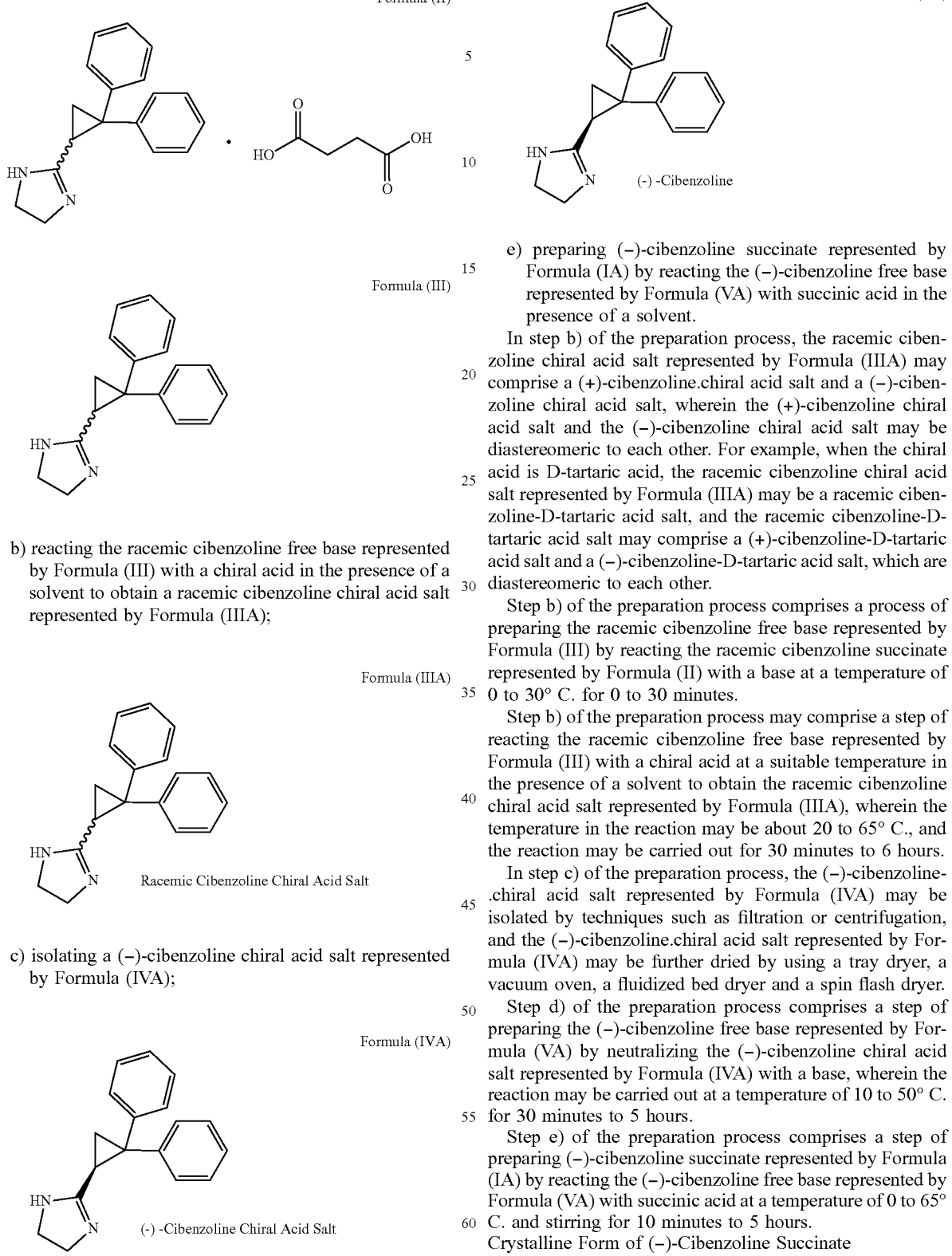

Formula (III)

b) reacting the racemic cibenzoline free base represented by Formula (III) with a chiral acid in the presence of a solvent to obtain a racemic cibenzoline chiral acid salt represented by Formula (IIIA);

Formula (IIIA)

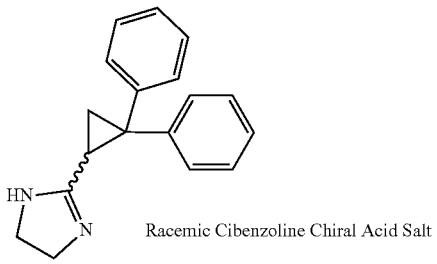

Racemic Cibenzoline Chiral Acid Salt c) isolating a (−)-cibenzoline chiral acid salt represented by Formula (IVA);

Formula (IVA)

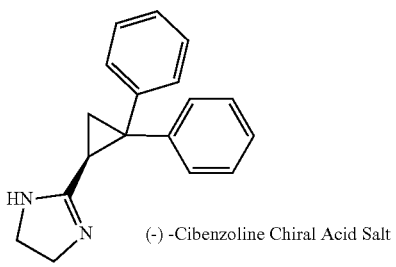

(−)-Cibenzoline Chiral Acid Salt d) preparing a (−)-cibenzoline free base represented by Formula (VA) by neutralizing the (−)-cibenzoline.chiral acid salt represented by Formula (IVA) with a base; and Formula (VA)

(−)-Cibenzoline e) preparing (−)-cibenzoline succinate represented by Formula (IA) by reacting the (−)-cibenzoline free base represented by Formula (VA) with succinic acid in the presence of a solvent.

In step b) of the preparation process, the racemic cibenzoline chiral acid salt represented by Formula (IIIA) may comprise a (+)-cibenzoline.chiral acid salt and a (−)-cibenzoline chiral acid salt, wherein the (+)-cibenzoline chiral acid salt and the (−)-cibenzoline chiral acid salt may be diastereomeric to each other. For example, when the chiral acid is D-tartaric acid, the racemic cibenzoline chiral acid salt represented by Formula (IIIA) may be a racemic cibenzoline-D-tartaric acid salt, and the racemic cibenzoline-D-tartaric acid salt may comprise a (+)-cibenzoline-D-tartaric acid salt and a (−)-cibenzoline-D-tartaric acid salt, which are diastereomeric to each other.

Step b) of the preparation process comprises a process of preparing the racemic cibenzoline free base represented by Formula (III) by reacting the racemic cibenzoline succinate represented by Formula (II) with a base at a temperature of 0 to 30° C. for 0 to 30 minutes.

Step b) of the preparation process may comprise a step of reacting the racemic cibenzoline free base represented by Formula (III) with a chiral acid at a suitable temperature in the presence of a solvent to obtain the racemic cibenzoline chiral acid salt represented by Formula (IIIA), wherein the temperature in the reaction may be about 20 to 65° C., and the reaction may be carried out for 30 minutes to 6 hours.

In step c) of the preparation process, the (−)-cibenzoline.chiral acid salt represented by Formula (IVA) may be isolated by techniques such as filtration or centrifugation, and the (−)-cibenzoline.chiral acid salt represented by Formula (IVA) may be further dried by using a tray dryer, a vacuum oven, a fluidized bed dryer and a spin flash dryer.

Step d) of the preparation process comprises a step of preparing the (−)-cibenzoline free base represented by Formula (VA) by neutralizing the (−)-cibenzoline chiral acid salt represented by Formula (IVA) with a base, wherein the reaction may be carried out at a temperature of 10 to 50° C. for 30 minutes to 5 hours.

Step e) of the preparation process comprises a step of preparing (−)-cibenzoline succinate represented by Formula (IA) by reacting the (−)-cibenzoline free base represented by Formula (VA) with succinic acid at a temperature of 0 to 65° C. and stirring for 10 minutes to 5 hours.

Crystalline Form of (−)-Cibenzoline Succinate

A first embodiment of the present invention provides a crystalline form of (−)-cibenzoline succinate, which has any one selected from the group consisting of the following X-ray powder diffraction patterns (XRPDs):

1) a crystalline form having an X-ray powder diffraction spectrum comprising diffraction peaks at 9.7°, 14.9°, 21.5°, 23.4° and 24.1° (2θ±0.2°) (hereinafter referred to as "crystalline form 1");

2) a crystalline form having an X-ray powder diffraction spectrum comprising diffraction peaks at 20.6°, 21.1°, 22.9°, 25.2° and 37.4° (2θ±0.2°) (hereinafter referred to as "crystalline form 2"); and 3) a crystalline form having an X-ray powder diffraction spectrum comprising diffraction peaks at 13.0°, 14.8°, 23.3°, 25.5° and 26.1° (2θ±0.2°) (hereinafter referred to as "crystalline form 3").

According to one embodiment of the present invention, crystalline form 1 of (−)-cibenzoline succinate has an X-ray powder diffraction pattern (XRPD) comprising diffraction peaks at 9.7°, 14.9°, 21.5°, 23.4° and 24.1° (2θ±0.2°).

According to an embodiment of the present invention, crystalline form 1 of (−)-cibenzoline succinate may have an XRPD pattern further comprising at least one diffraction peak selected from the group consisting of diffraction peaks at 16.5°, 17.2° and 26.1° (2θ±0.2°), in addition to XRPD diffraction peaks at 9.7°, 14.9°, 21.5°, 23.4° and 24.1° (2θ±0.2°).

According to an embodiment of the present invention, as shown in Table 1 below, crystalline form 1 of (−)-cibenzoline succinate may have an XRPD pattern comprising diffraction peaks at 8.98°, 9.67°, 13.35°, 14.12°, 14.90°, 16.53°, 17.18°, 18.36°, 19.05°, 20.07°, 21.50°, 23.40°, 24.06°, 24.78°, 25.38°, 26.08°, 27.44°, 28.24°, 29.41°, 30.20°, 31.20°, 32.52°, 33.80°, 35.29° and 38.33° (2θ±0.2°.

TABLE 1

Crystalline form 1 of (−)-cibenzoline succinate

| 2-theta(°) | D-value (Å) | Intensity % |
|---|---|---|
| 8.98 | 12.37 | 28 |
| 9.67 | 11.49 | 100 |
| 13.35 | 8.33 | 28 |
| 14.12 | 7.88 | 34 |
| 14.90 | 7.47 | 68 |
| 16.53 | 6.74 | 66 |
| 17.18 | 6.48 | 53 |
| 18.36 | 6.07 | 18 |
| 19.05 | 5.85 | 21 |
| 20.07 | 5.55 | 19 |
| 21.50 | 5.19 | 78 |
| 23.40 | 4.77 | 90 |
| 24.06 | 4.64 | 69 |
| 24.78 | 4.51 | 34 |
| 25.38 | 4.41 | 27 |
| 26.08 | 4.29 | 58 |
| 27.44 | 4.08 | 31 |
| 28.24 | 3.97 | 29 |
| 29.41 | 3.81 | 30 |
| 30.20 | 3.72 | 20 |
| 31.20 | 3.60 | 17 |
| 32.52 | 3.46 | 17 |
| 33.80 | 3.33 | 17 |
| 35.29 | 3.19 | 20 |
| 38.33 | 2.95 | 15 |

According to one embodiment of the present invention, crystalline form 2 of (−)-cibenzoline succinate has an X-ray powder diffraction pattern (XRPD) comprising diffraction peaks at 20.6°, 21.1°, 22.9°, 25.2° and 37.4° (2θ±0.2°).

According to one embodiment of the present invention, as shown in Table 2 below, crystalline form 2 of (−)-cibenzoline succinate may have an XRPD pattern comprising diffraction peaks at 16.72°, 19.06°, 20.58°, 21.14°, 22.87°, 24.13°, 25.16°, 27.07°, 28.64°, 32.68°, 34.54°, 37.35°, 39.44° and 40.95° (2θ±0.2°.

TABLE 2

Crystalline form 2 of (−)-cibenzoline succinate

| 2-theta(°) | D-value (Å) | Intensity % |
|---|---|---|
| 16.72 | 6.66 | 17 |
| 19.06 | 5.85 | 23 |
| 20.58 | 5.42 | 100 |
| 21.14 | 5.28 | 35 |
| 22.87 | 4.88 | 55 |
| 24.13 | 4.63 | 23 |
| 25.16 | 4.44 | 35 |
| 27.07 | 4.14 | 13 |
| 28.64 | 3.91 | 24 |
| 32.68 | 3.44 | 9 |
| 34.54 | 3.26 | 10 |
| 37.35 | 3.02 | 25 |
| 39.44 | 2.87 | 17 |
| 40.95 | 2.77 | 9 |

According to an embodiment of the present invention, crystalline form 3 of (−)-cibenzoline succinate is anhydrous and has an X-ray powder diffraction pattern (XRPD) comprising diffraction peaks at 13.0°, 14.8°, 23.3°, 25.5° and 26.1° (2θ±0.2°).

According to an embodiment of the present invention, crystalline form 3 of (−)-cibenzoline succinate is anhydrous and may have an XRPD pattern further comprising at least one diffraction peak selected from the group consisting of diffraction peaks at 9.7°, 12.8°, 14.6°, 16.1°, 16.3°, 17.5°, 19.4°, 22.4°, 22.7°, 23.5° and 25.4° (2θ±0.2°), in addition to XRPD diffraction peaks at 13.0°, 14.8°, 23.3°, 25.5° and 26.1° (2θ±0.2°).

According to an embodiment of the present invention, as shown in Table 3 below, crystalline form 3 of (−)-cibenzoline succinate is anhydrous and may have an XRPD pattern comprising diffraction peaks at 9.68°, 12.84°, 13.00°, 14.57°, 14.81°, 16.14°, 16.29°, 17.47°, 19.38°, 21.19°, 21.41°, 22.38°, 22.50°, 22.68°, 23.29°, 23.50°, 25.42°, 25.53°, 25.80°, 26.11°, 26.26°, 27.80°, 28.00°, 28.53°, 29.27°, 31.38°, 34.38° and 34.91°

TABLE 3

Crystalline form 3 of (−)-cibenzoline succinate

| 2-theta(°) | D-value (Å) | Intensity % |
|---|---|---|
| 9.68 | 9.13 | 26 |
| 12.848 | 6.89 | 22 |
| 13.00 | 6.81 | 88 |
| 14.57 | 6.07 | 40 |
| 14.81 | 5.98 | 100 |
| 16.14 | 5.49 | 20 |
| 16.29 | 5.44 | 23 |
| 17.47 | 5.07 | 38 |
| 19.38 | 4.58 | 37 |
| 21.19 | 4.19 | 12 |
| 21.41 | 4.15 | 13 |
| 22.38 | 3.97 | 30 |
| 22.50 | 3.95 | 16 |
| 22.68 | 3.92 | 36 |
| 23.29 | 3.82 | 49 |
| 23.50 | 3.78 | 34 |
| 25.42 | 3.50 | 23 |
| 25.53 | 3.49 | 42 |
| 25.80 | 3.45 | 16 |
| 26.11 | 3.41 | 78 |
| 26.26 | 3.39 | 15 |
| 27.80 | 3.21 | 11 |
| 28.00 | 3.13 | 10 |
| 28.53 | 3.13 | 10 |
| 29.27 | 3.05 | 11 |
| 31.38 | 2.85 | 10 |

TABLE 3-continued

Crystalline form 3 of (-)-cibenzoline succinate

| 2-theta(°) | D-value (Å) | Intensity % |
|---|---|---|
| 34.38 | 2.61 | 15 |
| 34.91 | 2.57 | 13 |

According to an embodiment of the present invention, crystalline form 3 of (−)-cibenzoline succinate may be anhydrous and may have a differential scanning calorimetry (DSC) endothermic peak at a temperature of about 190 to 193° C. at a temperature rise rate of 10° C./min. In general, measurements of the melting point and endothermic transition temperature are values within tolerances of ±2° C., or typically ±1° C.

According to an embodiment of the present invention, the particle size distribution of crystalline form 3 of (−)-cibenzoline succinate may have a particle size distribution in which 10% of the particles [$D_{10}$] are less than 10 μm, 50% of the particles [$D_{50}$] are 10 μm to 50 μm, and 90% of the particles [$D_{90}$] are greater than 50 μm. For example, $D_{10}$ may be 8.8 μm, $D_{50}$ may be 30.44 μm and $D_{90}$ may be 60.72 μm. In addition, $D_{50}$ may have a particle size of 10 μm to 50 μm, 15 μm to 45 μm, 20 μm to 40 μm, or 25 μm to 35 μm. It can be seen that the particle size of crystalline form 3 of (−)-cibenzoline succinate is very fine. Crystalline form 3 may be formulated without additional processes such as milling.

According to an embodiment of the present invention, the crystalline form of (−)-cibenzoline succinate may be characterized by having the following dynamic vapor sorption (DVS) pattern:
  i) showing a water absorption rate of 0.3% in a sorption cycle;
  ii) showing a water absorption rate of 0.2% at 80% relative humidity; and
  iii) completely releasing the 0.3% absorbed water in a desorption cycle.

It can be seen that crystalline form 3 of (−)-cibenzoline succinate shows a water absorption rate of 0.2% at room temperature and 80% relative humidity. It was confirmed that crystalline form 3 is non-hydroscopic (see European Pharmacopeia 5.0, 5.11. CHARACTERS SECTION IN MONOGRAPHS, Hygroscopicity classification).

According to an embodiment of the present invention, as shown in FIG. 4, crystalline form 3 of (−)-cibenzoline succinate may be a triclinic crystal system and may have a space group of P1.

According to an embodiment of the present invention, crystalline form 3 of (−)-cibenzoline succinate may be a triclinic crystal system and may have the following lattice constant parameters:
  α=7.87(6)Å
  b=8.00(9)Å
  c=9.36(12)Å
  α=96.71(5)°
  β=95.47(7)°
  γ=118.51(6)°
  V=507.06(10)Å³
  Z=1(1)

In addition, crystalline form 3 of (−)-cibenzoline succinate according to the present invention had excellent stability under accelerated conditions, and thus was stably maintained without a change in the content thereof for a long period of time. Thus, crystalline form 3 of (−)-cibenzoline succinate according to the present invention can be obtained as a high-purity raw material, and can be maintained at high purity in crystalline form for a long time even when stored for a long period of time.

Crystalline Forms 1 to 3 of (−)-cibenzoline succinate according to the present invention may be defined by additional physical properties such as solid C-NMR peaks, specific diffraction peaks at lattice plane spacings, morphologies on electron or optical micrographs of solid crystalline forms, particle sizes on electron or optical micrographs of solid crystalline forms, Brunauer-Emmett-Teller (BET) specific surface areas (SSA), reversed-phase gas chromatography (IGC) surface energy, or particle size distributions (D-values), etc.

A second embodiment of the present invention provides a crystalline form of (−)-cibenzoline succinate, which is a triclinic crystal system and has a space group of P1.

According to an embodiment of the present invention, the triclinic crystal system may have the following lattice constant parameters:
  α=7.87(6)Å
  b=8.00(9)Å
  c=9.36(12)Å
  α=96.71(5)°
  β=95.47(7)°
  γ=118.51(6)°
  V=507.06(10)Å³
  Z=1(1)

The triclinic crystal system is one of the seven crystalline systems described by three vectors in crystallography. In the triclinic crystal system, the three vectors have different lengths, and the angles formed by the vectors are different and not orthogonal.

The space group is a mathematical description of the symmetry inherent in the crystalline structure, and P1 corresponds to simple parallelogram lattices, and has only a simple translation transformation without having rotation, reflection or gliding reflection transformation. Two translation transformations constituting the spatial region may have different lengths, and the angle formed between them may be an arbitrary angle.

Process for Preparing Crystalline Form of (−)-Cibenzoline Succinate

A third embodiment of the present invention provides a process for preparing crystalline form 3 of (−)-cibenzoline succinate comprising steps of:
  a) dissolving (−)-cibenzoline succinate represented by Formula (IA) in a polar solvent; and
  b) precipitating crystalline form 3 of (−)-cibenzoline succinate by adding a hydrocarbon solvent having 6 or more carbon atoms to the solution of step a):

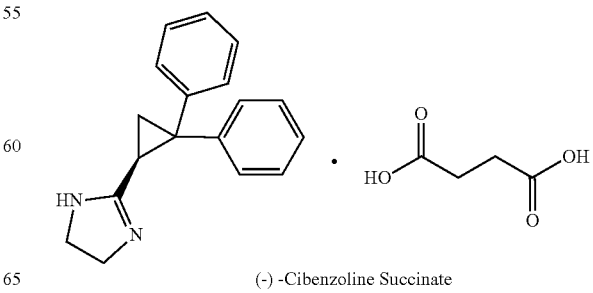

Formula (IA)

(−)-Cibenzoline Succinate

According to an embodiment of the present invention, crystalline form 3 of (−)-cibenzoline succinate is anhydrous and may have an XRPD pattern further comprising at least one diffraction peak selected from the group consisting of diffraction peaks at 9.7°, 12.8°, 14.6°, 16.1°, 16.3°, 17.5°, 19.4°, 22.4°, 22.7°, 23.5° and 25.4° (2θ±0.2°), in addition to XRPD diffraction peaks at 13.0°, 14.8°, 23.3°, 25.5° and 26.1° (2θ±0.2°).

According to an embodiment of the present invention, as shown in Table 3 above, crystalline form 3 of (−)-cibenzoline succinate is anhydrous and may have an XRPD pattern comprising diffraction peaks at 9.68°, 12.84°, 13.00°, 14.57°, 14.81°, 16.14°, 16.29°, 17.47°, 19.38°, 21.19°, 21.41°, 22.38°, 22.50°, 22.68°, 23.29°, 23.50°, 25.42°, 25.53°, 25.80°, 26.11°, 26.26°, 27.80°, 28.00°, 28.53°, 29.27°, 31.38°, 34.38° and 34.91° (2θ±0.2°).

According to an embodiment of the present invention, crystalline form 3 of (−)-cibenzoline succinate may be anhydrous and may have a differential scanning calorimetry (DSC) endothermic peak at a temperature of about 190 to 193° C. at a temperature rise rate of 10° C./min. In general, measurements of the melting point and endothermic transition temperature are values within tolerances of ±2° C., or typically ±1° C.

According to an embodiment of the present invention, as shown in FIG. 4, crystalline form 3 of (−)-cibenzoline succinate may be a triclinic crystal system and may have a space group of P1.

According to an embodiment of the present invention, crystalline form 3 of (−)-cibenzoline succinate may be a triclinic crystal system and may have the following lattice constant parameters:

$a=7.87(6)$Å
$b=8.00(9)$Å
$c=9.36(12)$Å
$\alpha=96.71(5)°$
$\beta=95.47(7)°$
$\gamma=118.51(6)°$
$V=507.06(10)$Å$^3$
$Z=1(1)$ According to an embodiment of the present invention, the process for preparing crystalline form 3 of (−)-cibenzoline succinate may further comprise an isolation or drying process.

According to an embodiment of the present invention, the isolation process may be performed using filtration or centrifugation.

According to an embodiment of the present invention, the drying process may be performed using a tray dryer, a vacuum oven, a fluidized bed dryer and a spin flash dryer.

According to an embodiment of the present invention, the process for preparing crystalline form 3 of (−)-cibenzoline succinate may further comprise a cooling process.

According to an embodiment of the present invention, the cooling may be performed at room temperature (about 20 to 30° C.) for 1 week or 2 weeks, or may be performed at 5° C. for a few minutes or up to two weeks for equilibration.

According to an embodiment of the present invention, step a) is a process in which the (−)-cibenzoline succinate represented by Formula (IA) is added to a solvent and then dissolved by heating. Examples of a solvent that may be used in this process include, but are not limited to, water, an alcohol-based solvent, an aldehyde-based solvent, an ester-based solvent, an amide-based solvent, and mixtures thereof.

According to an embodiment of the present invention, the alcohol solvent may be a linear or branched $C_1$ to $C_5$ alcohol. For example, it may be methanol, ethanol, linear or branched propanol, linear or branched butanol, linear or branched pentanol, or a mixture thereof. More specifically, it may be methanol, ethanol, linear or branched propanol, or a mixture thereof. More specifically, it may be methanol, linear or branched propanol, or a mixture thereof.

According to an embodiment of the present invention, step a) may be performed at 20 to 80° C., and the reaction time may be as short as a few minutes to as long as 2 weeks or more for equilibration.

According to an embodiment of the present invention, adding the hydrocarbon solvent having 6 or more carbon atoms in step b) may comprise adding a hydrocarbon solvent, which contains 6 or more carbon atoms and has low solubility for (−)-cibenzoline succinate, in an amount of 25 to 400% of the amount of the dissolution process solvent to form a precipitate.

According to an embodiment of the present invention, the hydrocarbon solvent having 6 or more carbon atoms in step b) may be cyclohexane, cycloheptane, n-hexane, n-heptane, or a mixture thereof.

Pharmaceutical Composition Containing Crystalline Form of (−)-Cibenzoline Succinate A third embodiment of the present invention provides a pharmaceutical composition containing an effective amount of the crystalline form of (−)-cibenzoline succinate as an active ingredient together with a pharmaceutically acceptable carrier, diluent or excipient.

The composition may be formulated in a dosage form selected from the group consisting of powders, granules, tablets, capsules, suspensions, emulsions, syrups, aerosols, ointments, creams, suppositories, eye drops, and injections, according to conventional formulation methods known to those skilled in the art.

The composition may exhibit a preventive or therapeutic effect against at least one disease selected from the group consisting of heart disease, arrhythmic heart disease, and heart failure.

According to an embodiment of the present invention, the pharmaceutical composition may be prepared in unit dose form or supplied in a multi-dose container by formulating it using a pharmaceutically acceptable carrier according to a method that may be easily carried out by a person of ordinary skill in the art to which the present invention pertains.

According to an embodiment of the present invention, the content of the additive in the pharmaceutical composition is not particularly limited and may be appropriately adjusted within the range that is used for conventional formulation.

According to an embodiment of the present invention, the pharmaceutical composition may be administered to a patient in an effective amount through various routes, for example, an oral or parenteral route. Preferably, the composition of the present invention may be formulated in oral dosage forms such as capsules, tablets, dispersions and suspensions.

The preferred dosage and administration frequency of the pharmaceutical composition according to the embodiment of the present invention may vary depending on the patient's weight, age, sex, health condition, diet, administration time, the mode of administration, the administration duration or interval, excretion rate, constitutional specificity, the property of formulation, and the severity of disease, and may be selected appropriately by those skilled in the art.

Advantageous Effects

The crystalline form of (−)-cibenzoline succinate according to the present invention has low hygroscopicity, excellent stability under accelerated conditions and long-term storage conditions, and may be stably maintained without change in the content thereof for a long period of time. Thus, the crystalline form of (−)-cibenzoline succinate according to the present invention may be obtained as a high-purity raw material, and may be maintained at high purity in crystalline form for a long period of time even when stored for a long period of time.

MODE FOR INVENTION

Figure 1:
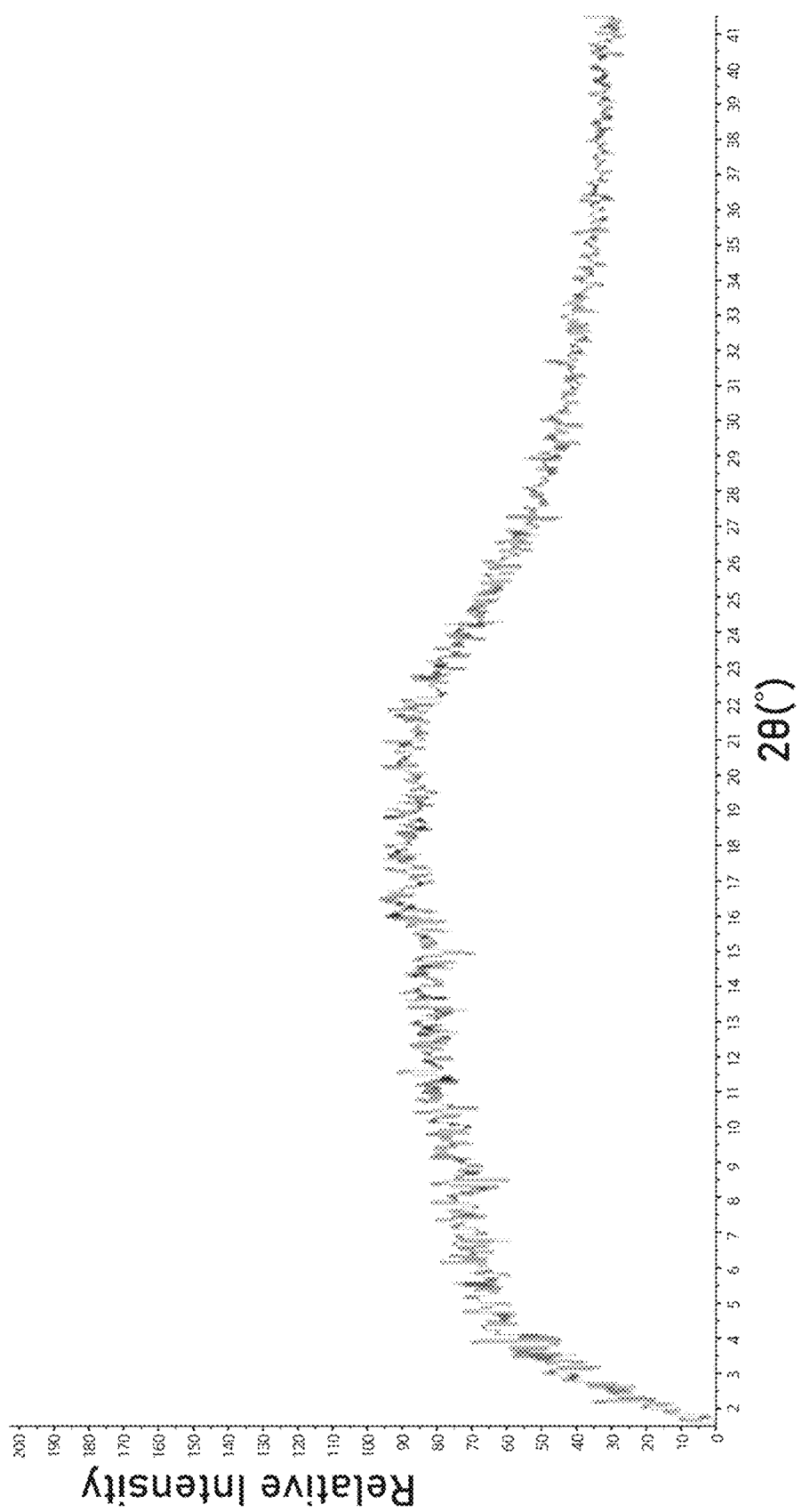
FIG. 1 shows the X-ray powder diffraction (XRPD) pattern of an amorphous form of (−)-cibenzoline succinate prepared according to Example 1.

The process details of the present invention are provided in the examples given below, but these examples are provided by way of illustration only, and thus the scope of the present invention is not limited by these examples.
<Instrumental Analysis and Measurement Conditions>
1. Chiral Purity (HPLC) Analysis The chiral purity (e.e) of the prepared compound was measured by high-performance liquid chromatography (HPLC) under the measurement conditions shown in Table 4 below.

TABLE 4

| HPLC conditions | |
| --- | --- |
| Column | Chiralpak IC, 250 × 4.6 mm, 5 μm, column temperature: 35° C. |
| Mobile phase | A mixture of n-hexane, isopropyl alcohol, ethanol and diethyl amine at a ratio of 80:10:10:0.1 (v/v/v/v) |
| Flow rate | 0.8 mL/min. |
| Detection | 220 nm. |
| Instrument details | System manufacturer: Shimadzu. LC-2030C, i-services. |

2. $^1$H-NMR and $^{13}$C-NMR Analysis

The nuclear magnetic resonance spectrum of (−)-cibenzoline succinate was obtained using Bruker advance-III FT-NMR. $^1$H NMR was measured at 400 MHz (in DMSO-$D_6$) and $^{13}$C NMR was measured at 400 MHz (in $CD_3OD$).

3. Infrared Spectroscopy (IR) Analysis

IR analysis of (−)-cibenzoline succinate was performed using a PerkinElmer spectrum FT-IR spectrophotometer. IR spectrum was recorded by using a KBr disc.

4. Mass Spectral Analysis

Mass spectral analysis of (−)-cibenzoline succinate was performed using an Agilent LCQ Fleet Thermo-ion trap mass spectrometer equipped with Electro Spray Ionization (ESI).

5. UV-Visible Spectroscopy Analysis

UV-visible spectroscopy analysis of (−)-cibenzoline succinate was performed using a UV visible spectrophotometer of Perkin-Elmer (model Lambda 25). A solution of 10 μg/ml was prepared by dissolving (−)-cibenzoline succinate in methanol as solvent and scanned from 200 nm to 400 nm.

6. Specific Optical Rotation Analysis

Specific optical rotation analysis of a (−)-cibenzoline succinate solution whose concentration is 1.401 g/100 ml (in methanol) was performed on Agilent Autopol V, Serial #81225 at room temperature.

7. Single-Crystal X-Ray Diffraction (XRD) Analysis

The single crystal XRD of crystalline form 3 was analyzed using the following modeling method under the following conditions.
  Manufacturer: Bruker, USA
  Model: Nonius Kappa-CCD
  Measurement temperature: 296K
  Full sphere data: Reflected light measurement at up to θ=32.6°
  Modeling method for single-crystal structure identification
  1) Data reduction: HKL Scalepack (Otwinowski & Minor 1997)
  2) Cell parameter: Denzo and Scalepak (Otwinowski & Minor, 1997)
  3) Structure solving method: SHELXT-2014/7 (Sheldrick, G. M., 2015a)
  4) Square full matrix refinement: SHELXL-2014/7 (Sheldrick, G. M., 2015b)

8. High-Throughput X-Ray Diffraction (XRD) Analysis

The high-throughput XRD of the crystalline form was analyzed under the following conditions.
  Manufacturer: Bruker, USA
  Model: General Area Detector Diffraction System (GADDS)
  Measurement temperature: 25° C. (RT)
  2θ measurement range: 1.5 to 41.5°
  Exposure time: 90 seconds
  Others: Measurement of intensity and geometric parameters with a V A NTEC-500 gas area detector (Bruker, USA)

9. High-Resolution X-Ray Diffraction (XRD) Analysis

The high-resolution XRD of the crystalline form was analyzed using the following modeling method under the following conditions.
  Manufacturer: Bruker, USA
  Model: D8 Advance diffractometer
  Measurement radiation: Cu Kα1 radiation (1.54056 Å)
  Measurement temperature: 25° C. (RT)
  2θ measurement range: 2 to 41.5°
  Detector: LynxEye detector (Bruker, USA)
  Detection rate: 5 sec/step (1 step=0.016°)
  Sample measurement: 8-mm long glass capillary with 0.5 mm outer diameter
  Exposure time: 90 seconds 10. Thermogravimetric Analysis Coupled with Mass Spectroscopy (TGMS)

Thermogravimetric analysis coupled with mass spectroscopy for the crystalline form was performed under the following conditions.
  Manufacturer: Mettler-Toledo GmbH, Switzerland
  Model: TGA/DSC 3+ STARe system
  Temperature range: 25 to 300° C.
  Temperature rise rate: 10° C./min
  Mass spectrometer: mass spectrometer Omnistar GSD 301 T2 (Pfeiffer Vacuum GmbH, Germany)

11. Differential Scanning Calorimetry (DSC) Analysis

The calorimetric analysis of the crystalline form was performed by differential scanning calorimetry (DSC) under the following conditions.
- Manufacturer: Metter Toredo GmbH, Switzerland
- Model: heat flux DSC3+ STARe system
- Temperature rise rate: 10° C./min
- Temperature range: 25 to 300° C.
- $N_2$ flow rate: 50 ml/min.

12. Karl Fischer Titration Analysis

The hydrate and water contents of the crystalline form were measured by Karl Fischer titration under the following conditions.
- Manufacturer: SI Analytics, Germany
- Model: Titroline 7500 KF trace titrator
- Solvent: methanol 13. Polarized Light Microscopy Analysis The morphology of the crystalline form was measured with a polarizing microscope under the following conditions.
- Manufacturer: Leica Microsystems GmbH, Germany
- Model: Leica DM 2500M optical microscope 14. Ultra-Performance Liquid Chromatography-Mass Spectrometer (UPLC-MS) Analysis The mass of the crystalline form was measured by ultra-performance liquid chromatography-mass spectrometer (UPLC-MS) under the following conditions.
- Manufacturer: Agilent, USA
- Model: Agilent 1290
- Detector 1: UV detector set at 224 nm
- Detector 2: MSD XT in Positive Scan Mode
- Measurement temperature: 25° C. (RT)
- Column: Agilent Eclipse Plus C18 HD (50×2.1 mm; 1.8 μm)
- Column temperature: 35° C.
- Flow cell: 10 mm path
- Gradient: Mobile phase A: 10 mM Ammonium acetate/ Mobile phase B: Acetonitrile
- Flow: 0.8 ml/min
- Sample concentration: 0.8 mg/ml
- Solvent: Water: Acetonitrile (50:50 v/v)
- Injection: 1 μl
- Retention time: 1.54 min 15. Analysis of Particle Size Distribution (PSD)

The particle size of the crystalline form was measured with a laser diffraction particle size analyzer under the following conditions.
- Manufacturer: Malvern Instruments Limited, UK
- Model: Mastersizer 2000
- Sampler: Hydro 2000 G/S Instrumental Conditions:
- Particle reflection index (RI)): 1.52
- Dispersant: heptane
- Absorbance: 0.1
- Refractive index of dispersant: 1.39
- Analysis model: general purpose
- Sensitivity: enhanced
- Absorption limit: 10-15%
- Measurement time: 30 seconds (repeated three times per sample)
- Agitation speed: 3500 RPM Sample Preparation:

About 150 mg of the sample was dissolved in 20 ml of 0.2% Span 85-containing heptane in a 50 ml beaker. The solution was sonicated for about 10 seconds and placed in a sampler, and when the absorption limit reached 10 to 15%, measurement was performed.

16. Dynamic Vapor Sorption (DVS) Analysis

Dynamic vapor sorption was measured using a vapor sorption analyzer under the following conditions.
- Manufacturer: Surface Measurement Systems Ltd, UK
- Model: DVS Adventure-I system
- Analysis of crystalline form of obtained solid: HT-XRPD Relative Humidity Cycle:

Relative humidity was cycled from 40% to 95% (sorption), from 95% to 0% (desorption) and back to 40% (sorption 2). In each step, the relative humidity was changed to 10% at a constant temperature of 25° C. The weight equilibrium was set to a dm/dt of 0.002%/min.

PREPARATION EXAMPLES

Preparation Example 1: Preparation of (−)-Cibenzoline Succinate

Preparation Example 1-1: Preparation of (±)-Cibenzoline Free Base 50 g of a suspension of (±)-cibenzoline succinate was stirred in 200 ml of water and basified with 10% sodium hydroxide solution to a pH of 10.5 to 10.8 over 30 minutes at a temperature of 25 to 30° C. and extracted with 400 ml of ethyl acetate. The obtained organic layer was dried over anhydrous sodium sulfate, followed by concentration under reduced pressure (400-20 mmHg) at 45° C. or lower to afford 30 g of (±)-cibenzoline free base as a white solid.

[Chiral purity measured by chiral HPLC: mixture of (−)-cibenzoline 48.76% and (+)-cibenzoline 51.24%]

Preparation Example 1-2: Preparation of (−)-Cibenzoline-D-Tartrate 15 g of the (±)-cibenzoline free base prepared according to Preparation Example 1-1 was dissolved in 250 ml of acetonitrile and then stirred at a temperature of 25 to 30° C. for 15 min, and D-(−)-tartaric acid (1.0 m. eq.) solution in water (30 ml) was added thereto 20 min at a temperature of 25 to 30° C. to obtain a mixture. The mixture was stirred for 30 min, and 250 ml of methyl tert butyl ether (MTBE) was added to the mixture over 20 min, followed by stirring for 2.5 hours at room temperature, thereby preparing a mixture. The mixture was heated to a temperature of 50 to 55° C., stirred for 1 hour, and then allowed to cool at 25 to 30° C. and stirred for 1 hour. The obtained solid was filtered and washed with 23 ml of acetonitrile to afford (−)-cibenzoline-D-tartrate (6.4 g) having 99.0% chiral purity measured by chiral HPLC (yield: 41 (w/w) %).

$^1$H-NMR (400 MHz, $CD_3OD$): 7.38 (m, 6H); 7.29 (m, 3H); 7.20 (m, 1H); 4.40 (s, 2H); 3.71 (m, 2H); 3.52 (m, 2H); 2.83 (t, 1H); 2.34 (t, 1H); 1.90 (t, 1H) ppm.

$^{13}$C-NMR (100 MHz, $CD_3OD$): 177.01, 170.68, 144.71, 139.88, 130.73, 129.82, 129.72, 128.90, 128.77, 128.19, 74.21, 45.52, 42.54, 23.02, 20.11.

IR ($cm^{-1}$): 1731.23, 3531.63.

Preparation Example 1-3: Preparation of (−)-Cibenzoline Free Base 5 g of the (−)-cibenzoline-D-tartrate prepared according to Preparation Example 1-2 was added to 25 ml of water and basified with 50 ml of saturated sodium bicarbonate solution at a temperature of 25 to 30° C., and then extracted with 200 ml of dichloromethane. The extracted dichloromethane layer was dried over anhydrous sodium sulfate and distilled under reduced pressure (500-20 mmHg) at 40° C. or below to afford a (−)-cibenzoline free base (3.0 g) as a semisolid having [α]$_D$−153.82 and 99.09% chiral purity measured by chiral HPLC.

Figure 4:
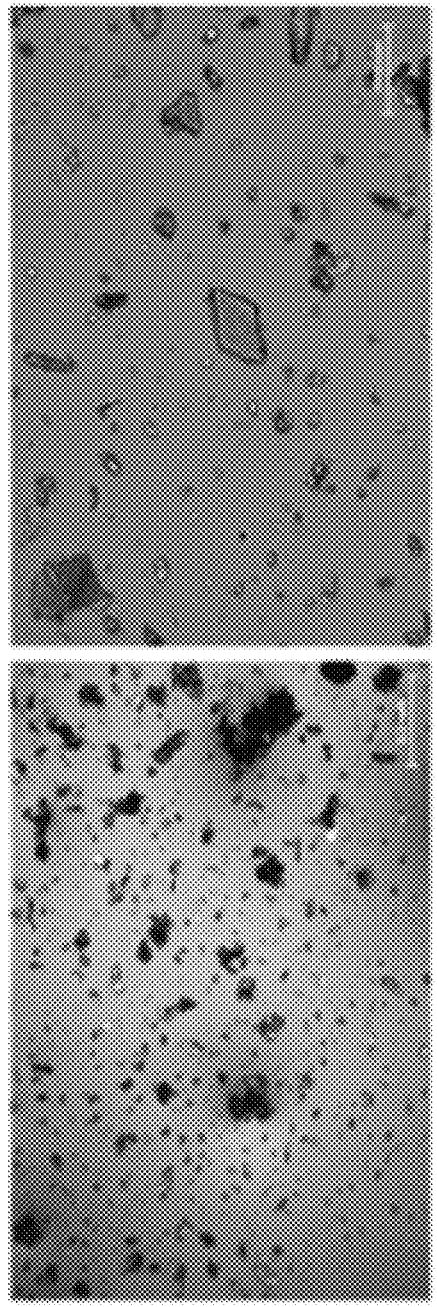
FIG. 4 schematically shows the particle morphology and lattice structure of crystalline form 3 of (−)-cibenzoline succinate on an optical micrograph thereof.
Figure 4:
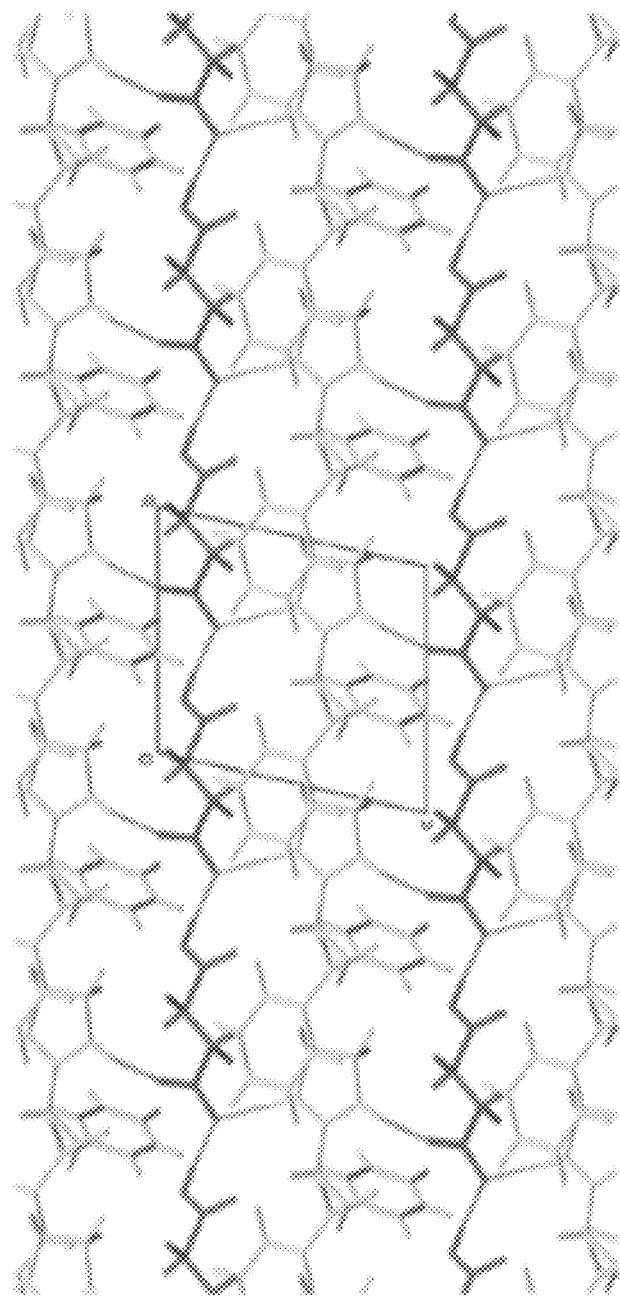

Preparation Example 1-4: Preparation of (−)-Cibenzoline Succinate 2.5 g of the (−)-cibenzoline base prepared according to Preparation Example 1-3 was dissolved in 25 ml of isopropanol and then stirred at a temperature of 50 to 55° C., and a solution of succinic acid (1.0 m. eq.) in 12.5 ml of methanol was added thereto over 10 minutes. The mixture was stirred at a temperature of 25 to 30° C. for 30 minutes, and then cooled at a temperature of 0 to 5° C. for 1 hour and 30 minutes. The resulting white solid was filtered, washed with 3.75 ml of isopropanol and then dried at a temperature of 40 to 45° C. under vacuum to afford pure (−)-cibenzoline succinate (3.2 g) having 99.9% chiral purity measured by chiral HPLC (FIG. 4).

$^1$H-NMR (400 MHz, CD$_3$OD): 7.38 (m, 6H); 7.29 (m, 3H); 7.21 (m, 1H); 3.71 (m, 2H); 3.53 (m, 2H); 2.82 (m, 1H); 2.50 (s, 4H); 2.36 (t, 1H); 1.91 (m, 1H) ppm.

$^{13}$C-NMR (100 MHz, CD$_3$OD): 179.20, 170.55, 141.73, 139.83, 130.70, 129.78, 129.69, 128.84, 128.76, 128.16, 45.41, 42.41, 32.96, 23.00, 21.01 ppm.

IR spectrum: 1674.96 cm$^{-1}$ (Acid C=O stretching vibration), 2954.43 cm$^{-1}$ (Sp3 stretching vibration).

MW (g/mol): 380.44 m/z of (−)-Cibenzoline: 263.35 (theoretical), 263 (observed)

UV absorption: 1.155 absorption at 202.5 nm

Specific Optical Rotation: [α]$_D$−124.47; Rotation−VE.

EXAMPLES

Example 1: Preparation of Amorphous Form of (−)-Cibenzoline Succinate 2,083.4 mg of the (−)-cibenzoline succinate prepared according to Preparation Example 1 was dissolved in 30,000 μL of a t-BuOH/distilled water (50/50 v/v %) solvent, and then freeze-dried at −73° C. for 16 hours, thereby preparing an amorphous form of (−)-cibenzoline succinate.

Through high-throughput XRD analysis of the obtained amorphous form, it was confirmed that the obtained amorphous form was amorphous as shown in FIG. 1.

Example 2: Preparation of Crystalline Form 1 of (−)-Cibenzoline Succinate 33 mg of the amorphous form of (−)-cibenzoline succinate prepared according to Example 1 was dissolved in 350 μL of distilled water to obtain a suspension which was then stored at room temperature for 2 weeks for equilibrium. Thereafter, the liquid phase was removed by a centrifuge, and the remaining material was dried under atmospheric pressure to obtain crystalline form 1 of (−)-cibenzoline succinate.

Figure 2:
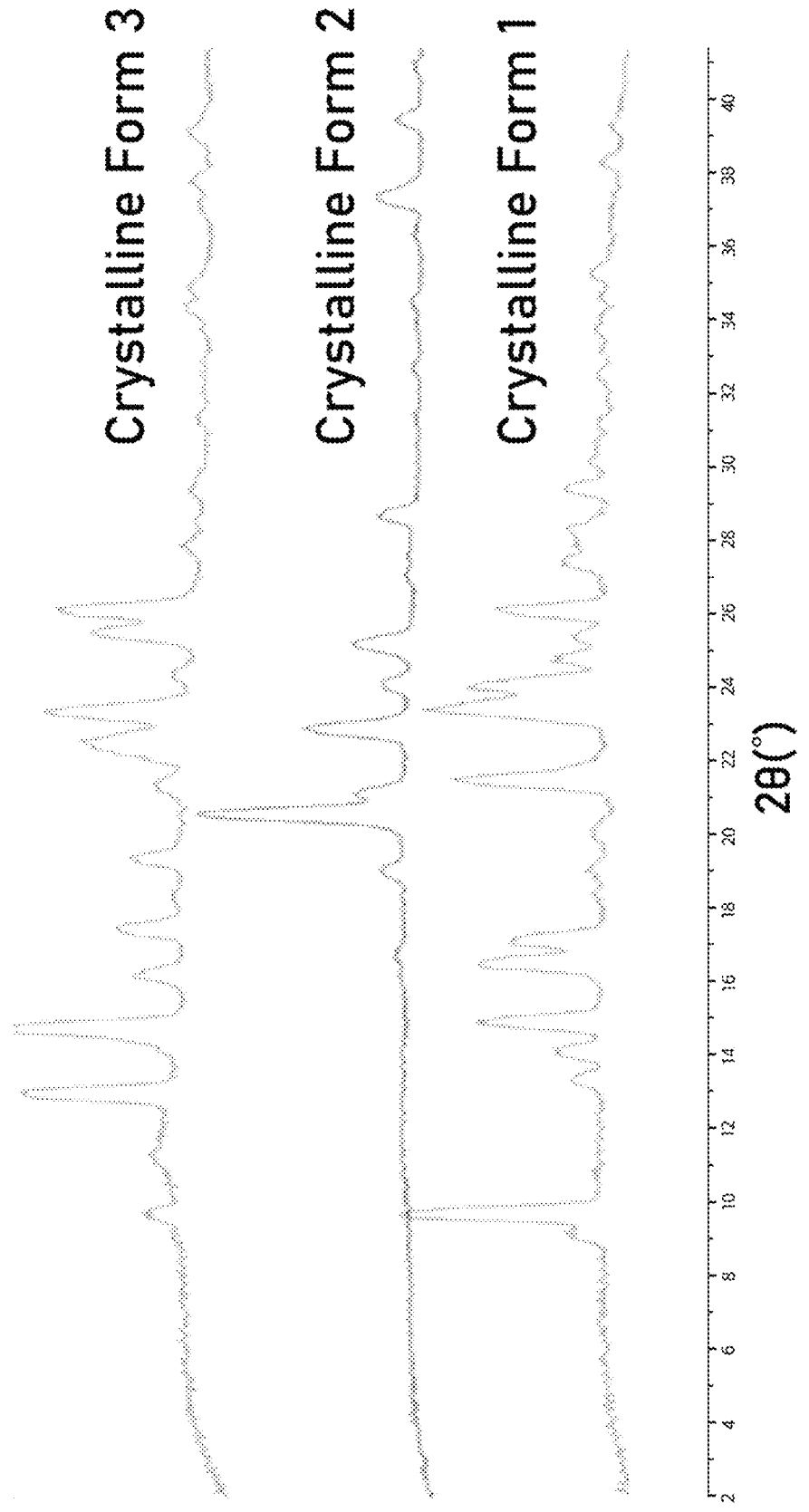
FIG. 2 shows the X-ray powder diffraction (XRPD) patterns of crystalline forms 1 to 3 of (−)-cibenzoline succinate prepared according to Examples 2 to 4.

Through high-throughput XRD analysis (HT-XRD) of the obtained crystalline form 1, it was confirmed that crystalline form was a novel crystalline form as shown in FIG. 2. As shown in Table 1 above, the diffraction peaks were analyzed by high-resolution XRD analysis (HR-XRD). Through thermogravimetric analysis coupled with mass spectroscopy (TGMS), it was confirmed that crystalline form 1 was a hydrate, and through Karl Fischer titration, it was confirmed that crystalline form 1 had a water content of 10.5%. Differential scanning calorimetry (DSC) analysis results showed that the DSC melting endothermic transition peak first started at about 47.20° C., reached a maximum at about 47.94° C., ended at 49.75° C., and then reached a maximum at about 58.81° C., and ended at about 68.57° C., which was considered a peak for hydrate. Next, the DSC melting endothermic transition peak started at about 189.71° C. and reached a maximum at about 190.75° C., ended at 192.28° C.

Example 3: Preparation of Crystalline Form 2 of (−)-Cibenzoline Succinate 20 mg of the amorphous form of (−)-cibenzoline succinate prepared in Example 1 was dissolved in 200 μL of morpholine to obtain a suspension which was then subjected to three temperature change steps and then stored at room temperature for 3 days.

First step: temperature rise from room temperature to 50° C. at a temperature rise rate of 10° C./hour, and then temperature reduction from 50° C. to 5° C. at a temperature reduction rate of 20° C./hour.

Second step: temperature rise from 5° C. to 50° C. at a temperature rise rate of 10° C./hour, and then temperature reduction from 50° C. to 5° C. at a temperature reduction rate of 10° C./hour.

Three step: temperature rise from 5° C. to 50° C. at a temperature rise rate of 10° C./hour, and then temperature reduction from 50° C. to 5° C. at a temperature reduction rate of 5° C./hour, and then temperature rise from 5° C. to room temperature at a temperature rise rate of 10° C./hour.

After removing the liquid phase by a centrifuge, the remaining material was dried under vacuum (5 mbar) to obtain crystalline form 2 of (−)-cibenzoline succinate.

Through high-throughput XRD analysis (HT-XRD) for the obtained crystalline form 2, it was confirmed that crystalline form 2 was a novel crystalline form as shown in FIG. 2. As shown in Table 2 above, the diffraction peaks were analyzed by high-resolution XRD (HR-XRD) analysis. Through thermogravimetric analysis coupled with mass spectroscopy (TGMS), it was confirmed that crystalline form 2 was a hydrate and contained the morpholine solvent. Differential scanning calorimetry (DSC) analysis results showed that the DSC melting endothermic transition peak first started at about 74.09° C. and reached a maximum at about 109.76° C., and ended at 116.45° C., and then started at about 120.42° C., reached a maximum at about 134.98° C., and ended at 145.93° C., and then started at about 184.90° C., reached a maximum at about 204.69° C., and ended at 265.85° C.

Example 4-1. Preparation of Crystalline Form 3 of (−)-Cibenzoline Succinate 25.2 mg of the (−)-cibenzoline succinate prepared according to Preparation Example 1 was dissolved in 400 μL of methanol at 50° C. to obtain a suspension, and then 20 mL of the anti-solvent cyclohexane was added thereto, followed by stirring for about 1 hour for crystallization. When the precipitate occurred, the liquid phase was removed by a centrifuge (Rotanta 46 RSC Centrifuge, Andreas Hettich GmbH & Co. KG, Germany) at 3,000 RPM for about 5 minutes, and the remaining material was dried under atmospheric pressure or under high vacuum (5 mbar, 18 hours) to obtain crystalline form 3 of (−)-cibenzoline succinate.

Figure 3:
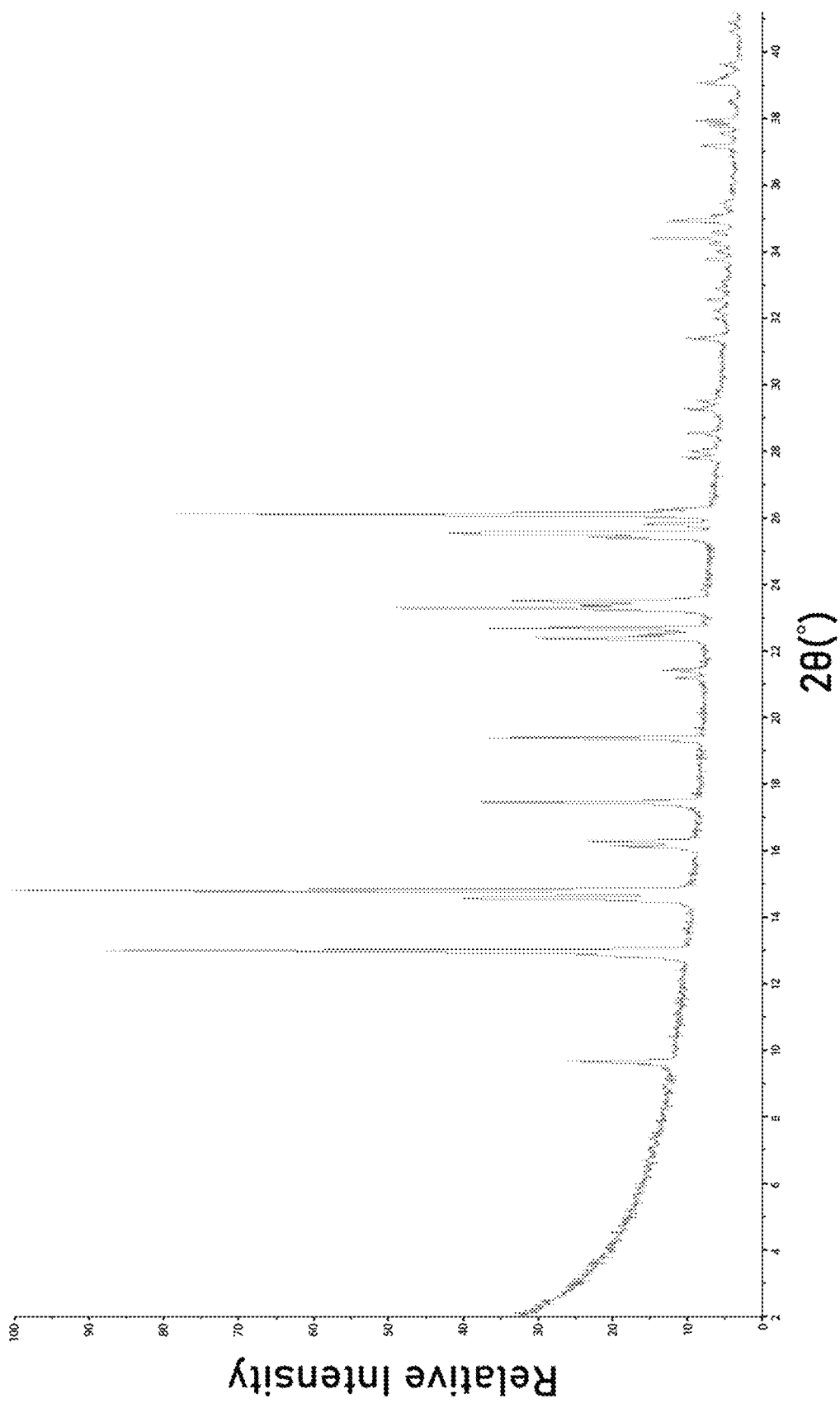
FIG. 3 shows the single-crystal high-resolution X-ray powder diffraction (XRPD) pattern of crystalline form 3 of (−)-cibenzoline succinate prepared according to Example 4.

Through high-throughput XRD analysis (HT-XRD) for the obtained crystalline form 3, it was confirmed that crystalline form 3 was a novel crystalline form as shown in FIG. 2. As shown in Table 3 above and FIG. 3, diffraction peaks were analyzed by high-resolution XRD (HR-XRD) analysis. Through thermogravimetric analysis coupled with mass spectroscopy (TGMS), it was confirmed that crystalline form 3 was anhydrous and did not contain the residual solvent. Differential scanning calorimetry (DSC) analysis results showed that the DSC melting endothermic transition peak started at about 190.26° C., reached a maximum at about 190.86° C., and ended at 192.70° C.

As a result of polarization microscope analysis, it was confirmed that crystalline form 3 was a single crystal as shown in FIG. 4. Through single crystal X-ray diffraction (XRD) analysis, as shown in FIG. 4, it was confirmed that crystalline form 3 was a triclinic crystal system and had a space group of P1. The crystalline data and structural refinement parameters are shown in Table 5 below.

TABLE 5

| Crystalline data and structural refinement parameters | |
|---|---|
| Crystal dimensions | 0.50 × 0.40 × 0.16 (mm$^3$) |
| Crystal system | Triclinic |
| Space group | P1 space group |
| Lattice constants | a = 7.8748(6) Å |
| | b = 7.9994(9) Å |
| | c = 9.3644(12) Å |
| | α = 96.714(5)° |
| | β = 95.469(7)° |
| | γ = 118.505(6)° |
| | V = 507.06(10) Å$^3$ |
| | Z = 1(1) |
| | Dc (density-calculated) = 1.246 (g/cm$^3$) |

Example 4-2: Preparation of Crystalline Form 3 of (−)-Cibenzoline Succinate(Scale-Up)

In addition, 2247.8 mg of the (−)-cibenzoline succinate prepared according to Preparation Example 1 was dissolved in 10 mL of methanol to obtain a suspension, and the suspension was divided in aliquots of 2 mL. 20 mL of cyclohexane as an anti-solvent was added to the divided suspension, followed by stirring for 1 hour for crystallization to obtain 1 g of crystalline form 3.

Example 5: Preparation of Crystalline Form 3 Using 1-Propanol Solvent and N-Heptane Anti-Solvent 21.8 mg of the (−)-cibenzoline succinate prepared according to Preparation Example 1 was dissolved in 2,500 μL of 1-propanol to obtain a supersaturated solution which was then placed in a 1.8 mL vial. The vial was placed in a 40 mL container containing 2 mL of the anti-solvent n-heptane. The container was sealed and stored at room temperature for 2 weeks. When the precipitate occurred, the liquid phase was removed by a centrifuge, and the remaining material was dried at atmospheric pressure to obtain a crystalline form of (−)-cibenzoline succinate.

Through high-throughput XRD (HT-XRD) analysis for the obtained crystalline form, it was confirmed that the crystalline form was crystalline form 3 of Example 4.

EXPERIMENTAL EXAMPLES

Experimental Example 1: Accelerated Storage Stability Test

For the crystalline and amorphous forms of (−)-cibenzoline succinate prepared according to Examples 1 to 4 above, a 48-hour storage stability test was performed under accelerated aging conditions (AAC; 40° C./75% RH). The test results are shown in Table 6 below.

TABLE 6

| Form | | Accelerated storage stability |
|---|---|---|
| Amorphous | Example 1 | Unstable - presence of different crystalline forms |
| Crystalline form 1 | Example 2 | Unstable - presence of different crystalline forms |
| Crystalline form 2 | Example 3 | Unstable - presence of different crystalline forms |
| Crystalline form 3 | Example 4 | Stable - presence of only crystalline form 3 |

It was confirmed that, among the amorphous and crystalline forms prepared in Examples 1 to 4, the stable crystalline form of (−)-cibenzoline succinate was crystalline form 3 of Example 4.

Experimental Example 2: Long-Term Stability

Crystalline form 3 of (−)-cibenzoline succinate prepared according to Example 4 was stored at 60° C. for 4 weeks, and then the long-term storage stability thereof was evaluated by HT-XRPD, DSC, TGMS and UPLC analysis. The experimental results are shown in Table 7 below.

TABLE 7

| | | | Default reference value | Week 1 | Week 4 |
|---|---|---|---|---|---|
| Crystalline form 3 | Example 4 | DSC (° C.) | 193.2 | 191.2 | 191.1 |
| | | TGA mass loss rate (%) | 0.6 | 0.2 | 0.6 |
| | | Chemical purity (%) | 100 | 100 | 100 |

It was confirmed that crystalline form 3 prepared according to Example 4 was stable without changes in the crystalline form and chemical purity thereof even when stored for a long period of time.

Experimental Example 3: Particle Size Analysis

The particle size of crystalline form 3 of (−)-cibenzoline succinate prepared according to Example 4 was measured by a laser diffraction particle analyzer. The experimental results are shown in Table 8 below.

TABLE 8

| | | $D_{10}$ (μm) | $D_{50}$ (μm) | $D_{90}$ (μm) |
|---|---|---|---|---|
| Crystalline form 3 | Example 4 | 8.80 | 30.44 | 60.72 |
| Reference Example | Preparation Example 1-4 | 17.10 | 127.82 | 307.56 |

It was confirmed that crystalline form 3 prepared according to Example 4 has a $D_{50}$ of 30.44 μm, which is smaller than a USP fine particle standard of 125 μm (see 2019 USP 42 NF 37 Volume 4 physical tests <811> powder fineness), indicating that the particle size of crystalline form 3 was very fine. Moreover, it was confirmed that the particle size of crystalline form 3 was significantly smaller than the particle size of the material prepared in Preparation Examples 1-4 so that the effective surface area of the drug increased, suggesting that the dissolution rate of the drug would increase, so that the absorption rate and bioavailability of the drug would increase.

Experimental Example 4. Dynamic Vapor Sorption Analysis

Dynamic vapor sorption data (water sorption isotherms) were measured by a vapor sorption analyzer. The experimental result is shown in FIG. 5.

Figure 5:
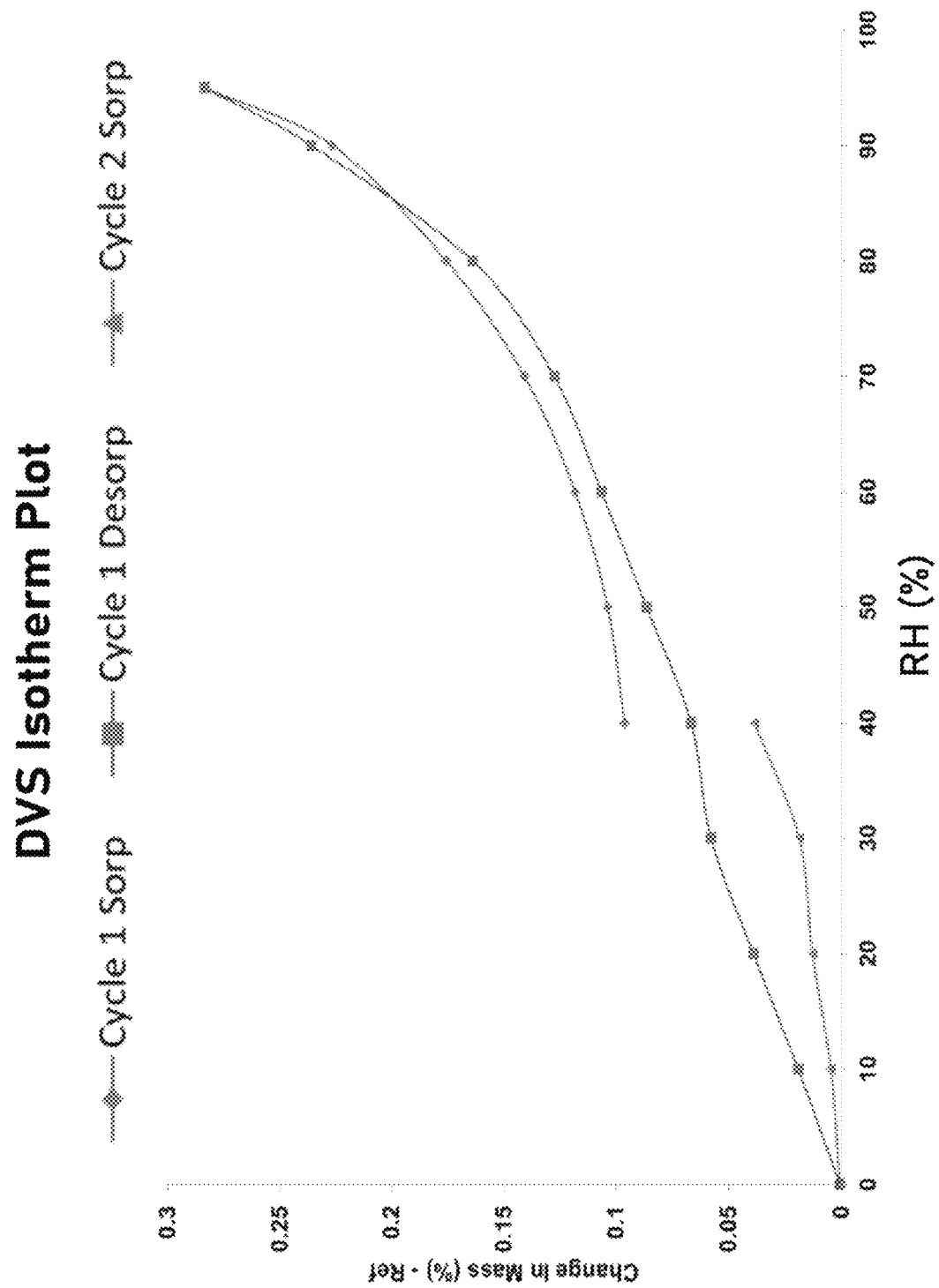
FIG. 5 show the results of dynamic vapor sorption (DVS) analysis of crystalline form 3 of (−)-cibenzoline succinate.

As shown in FIG. 5, crystalline form 3 showed a water absorption rate of up to 0.3% in the sorption cycle, and showed a water absorption rate of 0.2% at 80% relative humidity. Crystalline form 3 completely released the 0.3% absorbed water in the desorption cycle and absorbed almost no water in sorption 2. It was confirmed through HT-XRPD analysis that the sample obtained after DVS was maintained in Form D.

It was confirmed that crystalline form 3 prepared according to Example 4 was maintained even in an experimental reversible water sorption environment, indicating its stability even in a hygroscopic environment, and showed a water absorption rate of 0.2% at 80% relative humidity, suggesting that crystalline form 3 is non-hygroscopic (see European Pharmacopeia 5.0, 5.11. CHARACTERS SECTION IN MONOGRAPHS, Hygroscopicity classification).

The invention claimed is:

1. A crystalline form of (−)-cibenzoline succinate having an X-ray powder diffraction pattern (XRPD) selected from the group consisting of:
   i) a crystalline form 1 having an X-ray powder diffraction spectrum comprising diffraction peaks at 9.7°, 14.9°, 21.5°, 23.4° and 24.1° (2θ±0.2°);
   ii) a crystalline form 2 having an X-ray powder diffraction spectrum comprising diffraction peaks at 20.6°, 21.1°, 22.9°, 25.2° and 37.4° (2θ±0.2°); and
   iii) a crystalline form 3 having an X-ray powder diffraction spectrum comprising diffraction peaks at 13.0°, 14.8°, 23.3°, 25.5° and 26.1° (2θ±0.2°).

2. The crystalline form of (−)-cibenzoline succinate of claim 1, which is wherein the crystalline form is anhydrous and has crystalline form 3.

3. The crystalline form of (−)-cibenzoline succinate of claim 2, wherein the XRPD pattern further comprises at least one diffraction peak selected from the group consisting of diffraction peaks at 9.7°, 12.8°, 14.6°, 16.1°, 16.3°, 17.5°, 19.4°, 22.4°, 22.7°, 23.5° and 25.4° (2θ±0.2°).

4. The crystalline form of (−)-cibenzoline succinate of claim 1, having a differential scanning calorimetry (DSC) endothermic peak at a temperature of 190° C. to 193° C. at a temperature rise rate of 10° C./min.

5. The crystalline form of (−)-cibenzoline succinate of claim 1, having a particle size distribution wherein 50% of the particles [$D_{50}$] have a particle size of 10 μm to 50 μm.

6. The crystalline form of (−)-cibenzoline succinate of claim 1, wherein the crystalline form comprises the following dynamic vapor sorption (DVS) pattern:
   i) a water absorption rate of 0.3% in a sorption cycle;
   ii) a water absorption rate of 0.2% at 80% relative humidity; and
   iii) a complete release of 0.3% absorbed water in a desorption cycle.

7. A crystalline form of (−)-cibenzoline succinate comprising a triclinic crystal system and has a space group of P1.

8. The crystalline form of (−)-cibenzoline succinate of claim 7, wherein the triclinic crystal system has the following lattice constant parameters:
   a=7.87 (6) Å;
   b=8.00 (9) Å;
   C=9.36 (12) Å;
   α=96.71 (5)°;
   β=95.47 (7)°;
   γ=118.51 (6)°;
   V=507.06 (10) Å3; and
   Z=+ (1)-1 (1).

9. A process for preparing crystalline form 3 of (−)-cibenzoline succinate, comprising:
   forming a solution utilizing a polar solvent to dissolve (−)-cibenzoline succinate represented by Formula (IA)

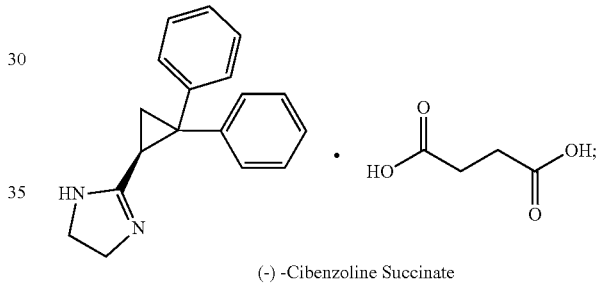

Formula (IA)

(-) -Cibenzoline Succinate and
   precipitating crystalline form 3 of (−)-cibenzoline succinate by adding a hydrocarbon solvent having 6 or more carbon atoms to the solution.

10. The process of claim 9, wherein the polar solvent is comprises one or more member of the group consisting of water, an alcohol-based solvent, an aldehyde-based solvent, an ester-based solvent, and an amide-based solvent.

11. The process of claim 10, wherein the alcohol-based solvent is comprises one or more member of the group consisting of methanol, ethanol, linear or branched propanol, linear or branched butanol, and linear or branched pentanol.

12. The process of claim 9, wherein the hydrocarbon solvent having 6 or more carbon atoms comprises one or more member of the group consisting of is cyclohexane, cycloheptane, n-hexane, and n-heptane.

13. A pharmaceutical composition containing the crystalline form of (−)-cibenzoline succinate of claim 1 and a pharmaceutically acceptable carrier, diluent or excipient.

14. The pharmaceutical composition of claim 13, comprising the form of a capsule or tablet for oral administration.

* * * * *